UNITED STATES PATENT OFFICE.

SVEN H. NORDIN, OF TACOMA, WASHINGTON.

FIRE-BRICK AND METHOD OF MAKING SAME.

1,192,099. Specification of Letters Patent. Patented July 25, 1916.

No Drawing. Application filed August 7, 1914. Serial No. 855,663.

*To all whom it may concern:*

Be it known that I, SVEN H. NORDIN, a subject of the King of Sweden, residing at Tacoma, in the county of Pierce and State of Washington, have invented certain new and useful Improvements in Fire-Bricks and Methods of Making Same, of which the following is a specification.

My invention relates to a new and improved brick having high fire resistance qualities, the primary object of my invention being the making of bricks from lime and quartz without the use of a cohesive medium such as fire-proof clays and the like.

A further object of my invention is the method of manufacturing bricks of the above described character in such a manner that they do not need to be fired or burnt, being merely treated in a tempering pan or oven. Because of the bricks not being burnt, or even having their exposed surfaces melted during manufacture, they are capable of withstanding higher temperatures than burnt bricks, as if their surface had once been melted it would be more readily remelted. Furthermore, the fact that the bricks are not burnt does away with a large proportion of the waste met with in burnt brick manufacture, due to broken, warped and otherwise deformed bricks which result from burning the bricks, due to moisture contained in their material.

In manufacturing bricks according to my improved process, the sole ingredients employed are quartz and lime. The quantity of lime employed should not exceed 6% of the total mass of quartz used as too large a proportion of lime causes a decrease in the fire resisting quality of the resultant bricks. The exact quantity of lime to be employed is ascertained by first determining the percentage of silica in the calcium carbonate from which the lime is to be made, the quantity of lime being in direct proportion to its percentage of silica. The quartz used should be as pure as possible, containing at least 99% silica, while the calcium carbonate in the form of limestone, chalk or the like should also be as pure as possible, yielding not less than 92% pure lime containing not more than 2% iron and clay, but rather less, if possible. The quartz and calcium carbonate are separately treated and then combined in a manner which will be more fully explained. The quartz is first crushed into lumps about the size of a man's fist and then heated to a temperature of approximately 1,500 degrees centigrade, after which it is crushed and sifted to a fine flour. One-third of this quartz flour should consist of grains from one and one-half to two millimeters in diameter, while the two-thirds should be more finely ground. The heating of the quartz separates all impure and volatile constituents therefrom, which might occur in the purest quartz, facilitates its pulverization and expels all moisture which otherwise, at higher temperatures, might cause expansion or bursting of the finished brick. In heating the quartz, care should be taken that no direct firing with coal, coke and the like is permitted, because combinations of impurities contained in the quartz with sulfur might occur, as well as other chemical combinations, resulting in impairing the purity of the treated quartz. The heating of the quartz should be so conducted that all moisture is thoroughly expelled. If quartz of as high quality as specified is employed, the best results are obtained, the resultant brick paste being more cohesive and at the same time forming a brick of minimum brittleness.

The calcium carbonate to be employed is heated in the same manner as the quartz, to expel all moisture and volatile impurities and the resultant lime is then slaked in specially constructed boxes contained in tempering ovens or cylinders, the construction of which need not be described as being well known. The lime, however, should not be slaked until just before it is to be mixed with the previously prepared quartz. It will be clear that the quantity of lime employed must be varied in proportion to its silica because the silica existing in the lime has no cohesive action with the quartz. However, too large a proportion of lime causes a decrease in the fire resisting quality of the brick and should be, for this reason, avoided. Usually a quantity of lime equal to about 6% of the quantity of quartz used is employed and the lime and a portion of the quartz, both having been treated as above described, are mixed in any suitable form of mechanical mixer as thoroughly as possible, while dry. Water is then added and then the remaining quartz, together with additional water, the whole mass being then thoroughly mixed to form a homogeneous paste having the consistency of dough. This mass should contain substantially 6% water in order to secure the best results. Bricks in the raw state can now be obtained from this mass or dough by passing said mass through a brick-press, the best results being obtained if the raw bricks are formed as soon as possible after mixing the mass. The raw bricks thus obtained must immediately, that is, soon enough to prevent even surface drying of the bricks, be placed in a tempering oven or pan and gradually heated while exposed to a steam pressure. This heating should extend over three or four hours and the steam pressure should be from ten to twelve atmospheres, the higher the better. After this gradual heating, a constant temperature is maintained, under the same steam pressure, for eight to ten hours, after which the pan or oven is permitted to cool under diminishing pressure. The bricks may now be taken out of the pan or oven, ready for use. With bricks so formed, the combining or cohesive agent consists of calcium silicate and not of clays, the silicates being formed during the tempering process in the oven, their formation probably depending upon the fact that some of the silicic acid, during heating of the quartz, has been transformed to a free state. The resultant bricks possess the highest degree of fire resisting qualities, even up to 1830° centigrade and do not need to be burnt. The finished brick is porcelain white but its color can, of course, be changed through the addition of harmless anilin dyes or other similar coloring matters to the water added in mixing the quartz and lime.

It will be understood that throughout the specification and claims wherever the term calcium carbonate is employed, I mean to refer to some natural form of calcium carbonate, such as limestone, chalk or the like, which naturally contains a certain amount of impurities. Consequently, wherever reference is made to lime, this lime being made from the calcium carbonate, it will be understood that I do not refer to chemically pure lime, but merely to lime of such purity as can be formed from the crude calcium carbonate employed.

In addition to the superior quality of the bricks manufactured by the above process, the additional advantage of cheapness in manufacture should be noted, one of the large factors entering into this reduction in cost being the lack of waste through burning of the bricks, which burning is necessary under the old methods employed.

Obviously, I cannot be limited to any specific proportions of lime and quartz as such proportions depend upon the purity of the ingredients employed, particularly upon the amount of silica contained in the lime. For this reason I reserve the right to make such changes in proportions and in the process, as may be warranted by the following claims which constitute a part of this application.

Having thus described the invention, what is claimed as new is:

1. The process of constructing bricks which consists in separately heating quartz and calcium carbonate to a temperature of approximately 1500° centigrade, in crushing and sifting the quartz and resultant lime so heated to form a flour, in mixing the quartz and lime with water to form a brick making paste, in forming bricks from the paste, and in subsequently tempering the bricks under high steam pressure.

2. The process of constructing bricks which consists in separately heating quartz and calcium carbonate to a temperature of approximately 1500° centigrade, in crushing and sifting the quartz and resultant lime so heated to form a flour, in mixing the quartz and lime with water to form a brick making paste, in forming bricks from the paste, and in subsequently tempering the bricks under high steam pressure, the tempering being performed before the bricks have had an opportunity to become surface dried.

3. The process of constructing bricks which consists in separately heating quartz and calcium carbonate to a temperature of approximately 1500° centigrade, in crushing and sifting the quartz and resultant lime so heated to form a flour, in mixing the quartz and lime with water to form a brick making paste, in forming bricks from the paste, and in subsequently tempering the bricks under high steam pressure, the quantity of water employed being substantially 6%.

4. The process of manufacturing high fire resistance bricks which consists in separately heating calcium carbonate and quartz to expel all moisture and volatile impurities, in forming a flour from the quartz, in mixing the resultant lime with a portion of the quartz, in adding water to the mixture, in supplying additional water and the remainder of the quartz to the mixture thus formed, in forming bricks from the paste thus obtained, and in tempering the bricks under high steam pressure for a considerable length of time.

5. The process of constructing bricks, which consists in separately heating calcium carbonate and quartz to a temperature of not less than 1500° centigrade, in reducing the quartz and resultant lime to powders, one-third of the quartz being reduced to consist of grains from one and one-half to two millimeters in diameter, and the other two-thirds being more finely reduced, in mixing the lime and a portion of the quartz while dry, in adding water and the remaining quartz and thoroughly mixing the resultant paste, and in forming and tempering bricks from the paste thus obtained, the quantity of lime employed approximating 6% of the quantity of quartz employed.

6. The process of constructing bricks, which consists in separately heating calcium carbonate and quartz to a high temperature, in separately reducing them to powders, in determining the amount of silica contained in the line formed by heating the calcium carbonate, in combining with a portion of the quartz a quantity of lime which, if pure, would not exceed six per cent. of the total quantity of the quartz and which is increased in direct proportion to the percentage of the silica in the lime, adding water and the remaining quartz and thoroughly mixing the resultant paste, and in forming and tempering the bricks made from the paste thus obtained.

In testimony whereof I affix my signature in presence of two witnesses.

SVEN H. NORDIN. [L. S.]

Witnesses:
W. G. HEINLY,
L. E. TAYLOR.

Copies of this patent may be obtained for five cents each, by addressing the "Commissioner of Patents, Washington, D. C."